United States Patent [19]
Grant

[11] Patent Number: 5,853,283
[45] Date of Patent: *Dec. 29, 1998

[54] VEHICLE LIFTING AND TOWING METHOD AND APPARATUS

[75] Inventor: Robert Kirby Grant, Mullins, S.C.

[73] Assignee: East End Motors, Inc., Cle Elum, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 607,083

[22] Filed: Feb. 26, 1996

[51] Int. Cl.⁶ .................................................. B60P 3/12
[52] U.S. Cl. ........................ 414/563; 212/261; 254/124
[58] Field of Search ........................ 414/563; 280/402; 212/238, 261; 254/124

[56] References Cited

U.S. PATENT DOCUMENTS

| | | | |
|---|---|---|---|
| 2,183,478 | 12/1939 | Holmes et al. | 212/141 |
| 2,449,146 | 9/1948 | Ryan | 214/86 |
| 2,715,470 | 8/1955 | Marcus et al. | 214/86 |
| 3,285,443 | 11/1966 | Gaumont | 214/86 |
| 3,434,607 | 3/1969 | Nelson | 214/86 |
| 3,434,608 | 3/1969 | Nelson | 214/86 |
| 3,559,827 | 2/1971 | Schier | 214/86 |
| 3,599,811 | 8/1971 | Watkins | 214/86 |
| 3,667,631 | 6/1972 | Bishop | 214/86 |
| 3,841,506 | 10/1974 | Smith | 214/86 |
| 3,951,280 | 4/1976 | Peck | 214/86 |
| 4,000,823 | 1/1977 | Aquila | 214/86 |
| 4,186,938 | 2/1980 | Youngblood | 280/402 |
| 4,451,193 | 5/1984 | Cannon, Jr. et al. | 414/563 |
| 4,473,334 | 9/1984 | Brown | 414/563 |
| 4,637,642 | 1/1987 | Bubik | 280/402 |
| 4,674,943 | 6/1987 | Nespor | 414/563 |
| 4,678,392 | 7/1987 | Capers et al. | 414/563 |
| 4,679,978 | 7/1987 | Holmes et al. | 414/563 |
| 4,775,285 | 10/1988 | Zackovich | 414/563 |
| 4,797,057 | 1/1989 | Shoup et al. | 414/563 |
| 4,927,315 | 5/1990 | Nespor | 414/563 |
| 5,249,911 | 10/1993 | Marola | 414/563 |
| 5,284,415 | 2/1994 | Cullum et al. | 414/563 |
| 5,354,167 | 10/1994 | Cullum et al. | 414/563 |

FOREIGN PATENT DOCUMENTS

| | | | |
|---|---|---|---|
| 2274469 | 6/1974 | France | B60P 3/00 |
| 28 21 436 | 11/1979 | Germany | B60P 3/12 |
| 2061856 | 5/1983 | Germany | 212/261 |
| 1407262 | 9/1975 | United Kingdom | B60P 3/06 |
| 2238290 | 5/1991 | United Kingdom | 414/563 |

*Primary Examiner*—Thomas J. Brahan
*Attorney, Agent, or Firm*—Stratton Ballew PLLC

[57] ABSTRACT

A lifting apparatus is provided that is especially suited for mounting on a towing vehicle and for lifting a vehicle. The invention comprises an L-shaped member with a boom leg. The L-shaped member pivots on a base frame pivot and an upper pivot. Linkage arms hingeably connect the upper pivot to a camming crank. The camming crank has a forward direction of rotation and a rearward direction of rotation, and an actuator pivot. In the forward direction of rotation, a force means rotates the camming crank about the upper frame pivot, causing the linkage pivot of the camming crank to pull the linkage arms, so that the linkage arms tilt the L-shaped bar and so raise the boom leg. In the rearward direction of rotation, the force means rotates the camming crank in the opposite direction about the linkage pivot, pushing the linkage arms so that the linkage arms tilt the L shaped bar, lowering the boom leg. The force means can be an extending and retracting actuator such as a hydraulic cylinder and piston. The piston is connected to the actuator pivot and the cylinder is connected to an anchor pivot. The anchor pivot can be directly attached to the frame, located at the base end of the L-shaped member, or preferably attached to a lever arm. The lever arm extends from the base end of the L-shaped member, substantially parallel to the boom leg.

20 Claims, 8 Drawing Sheets

VEHICLE LIFTING AND TOWING METHOD AND APPARATUS

TECHNICAL FIELD

The invention relates to a lifting method and apparatus, and more particularly to a vehicle lifting method and apparatus, especially suited for a tow truck.

BACKGROUND OF THE INVENTION

Repeatably and reliably lifting a heavy object requires a sturdy and well-built mechanism that must also be economical to produce. The vehicle towing industry requires lifting mechanisms to be attached to tow trucks. One function of a tow truck's lifting mechanism is to lift an end of a vehicle and enable its transport without damage to the vehicle. A shortcoming in previous tow truck lifting mechanisms lies in their requirement of significant force to lift the vehicle. Therefore, a need exists for a lifting apparatus that is mountable on a tow truck and employs a mechanism for mechanical lift, to achieve vehicle lifts more effectively, using less force. Other industries, where heavy objects are routinely lifted, would also benefit from a method and apparatus that provides an improved lifting mechanism.

The structural support of known lifting mechanisms presents additional problems. For instance, in tow trucks, much of the weight of the towed vehicle must be supported by the lift mechanism. The transfer of this weight to the frame of the tow truck, through a system of hinges and pivots, challenges the structural strength of the lift mechanism. A shortcoming of currently used lift mechanisms is the poor balance between light weight and high strength. This is especially true in the new "wheel-lift" towing mechanisms, which have been developed to minimize damage to the towed vehicle and facilitate the extraction of the vehicle from a parallel parking space. Typically, wheel-lift towing mechanisms require a boom leg to be extended beneath the vehicle to be towed. The wheels of the vehicle are then attached by a wheel carriage assembly connected to the free end of the boom leg. The boom leg is then lifted or tilted and the vehicle is extracted without damage. Current wheel-lift systems with heavy booms, hinges and actuators, which are strong enough to lift heavy vehicles over years of steady use, are too heavy for the typical tow truck. Conversely, light weight lift mechanisms tend to be unreliable, or simply unable to perform heavier lifts. Mechanical failure from fatigue upon weight bearing members is common. Therefore, a need exists for a lifting apparatus better able to structurally support the weight of the towed vehicle and efficiently transfer that weight to the frame of the tow truck.

Tow trucks are typically retrofitted with lift mechanisms. A lift mechanism manufacturer receives a tow truck at its factory, where the lift mechanism is added. The customization of a truck to receive a lift mechanism is a difficult task, requiring expert technicians. To simplify the installation and retrofitting of a tow truck with the lift mechanism, the lift mechanism must be compact and also accommodate the frame configuration of the truck. A needs exists for a compact lift mechanism that accommodates the frame configuration of a tow truck and is especially suited for a retrofit installation.

SUMMARY OF INVENTION

According to the invention, a method and apparatus for an improved lifting mechanism is provided. The mechanism is compact and efficient and especially suited for mounting on a tow truck. The invention comprises an L-shaped member which includes a riser leg and a boom leg. The riser leg includes a base end and an upper end, and the boom leg includes a front end and a free end. The front end of the boom leg attaches to the base end of the riser leg. The L-shaped member hinges on a base frame pivot at the base end of the riser leg and on a riser pivot at the upper end of the riser leg. A linkage arm hingeably connects to the riser pivot bracket. The linkage arm also connects to a camming crank. The camming crank has a forward direction of rotation and a rearward direction of rotation, a crank pivot, an actuator pivot and an upper frame pivot. The upper frame pivot of the camming shaft hingeably mounts to a frame member. The crank pivot of the camming crank hingeably connects to the linkage arm. A force means rotates the camming crank in the forward direction of rotation about the upper frame pivot. The crank pivot pulls the linkage arm, so that the linkage arm pulls the riser leg and tilts the L-shaped member to raise the free end of the boom.

According to an aspect of the invention, the force means for rotating the camming crank rotates the camming crank in the rearward direction of rotation, about the upper frame pivot. The crank pivot pushes the linkage arm, so that the linkage arm pushes the riser leg and tilts the L-shaped member, to lower the free end of the boom.

According to another aspect of the invention, the force means for rotating the camming crank is an extending and retracting actuator. The extending and retracting actuator has an actuator pivot and an anchor pivot. The actuator pivot is connected to the camming crank.

According to another aspect of the invention, the anchor pivot is directly attached to the frame.

According to another aspect of the invention, the anchor pivot is attached to the base of the riser.

According to another aspect of the invention, the anchor pivot is attached to a lever arm. The lever arm extends from the base of the riser leg, substantially parallel to the boom leg.

According to another aspect of the invention, the extending and retracting actuator is a hydraulic cylinder and piston.

According to another aspect of the invention, the lifting apparatus is mounted on a towing vehicle.

According to another aspect of the invention, the lifting apparatus is mounted on a towing vehicle for lifting a vehicle.

The invention has the advantage of employing the principle of a mechanical lever in a lift mechanism to lift a vehicle more easily, using less force.

Another advantage of the invention is that the lift mechanism, when attached to a tow truck or the like, supports the weight of the towed vehicle and efficiently transfers the weight of the towed vehicle to the frame of the tow truck.

Yet another advantage of the invention is that the lift mechanism is especially suited for a retro-fit installation onto a tow truck. It is compact and accommodates the frame configuration of a tow truck.

DETAILED DESCRIPTION OF SPECIFIC EMBODIMENTS

Figure 1:
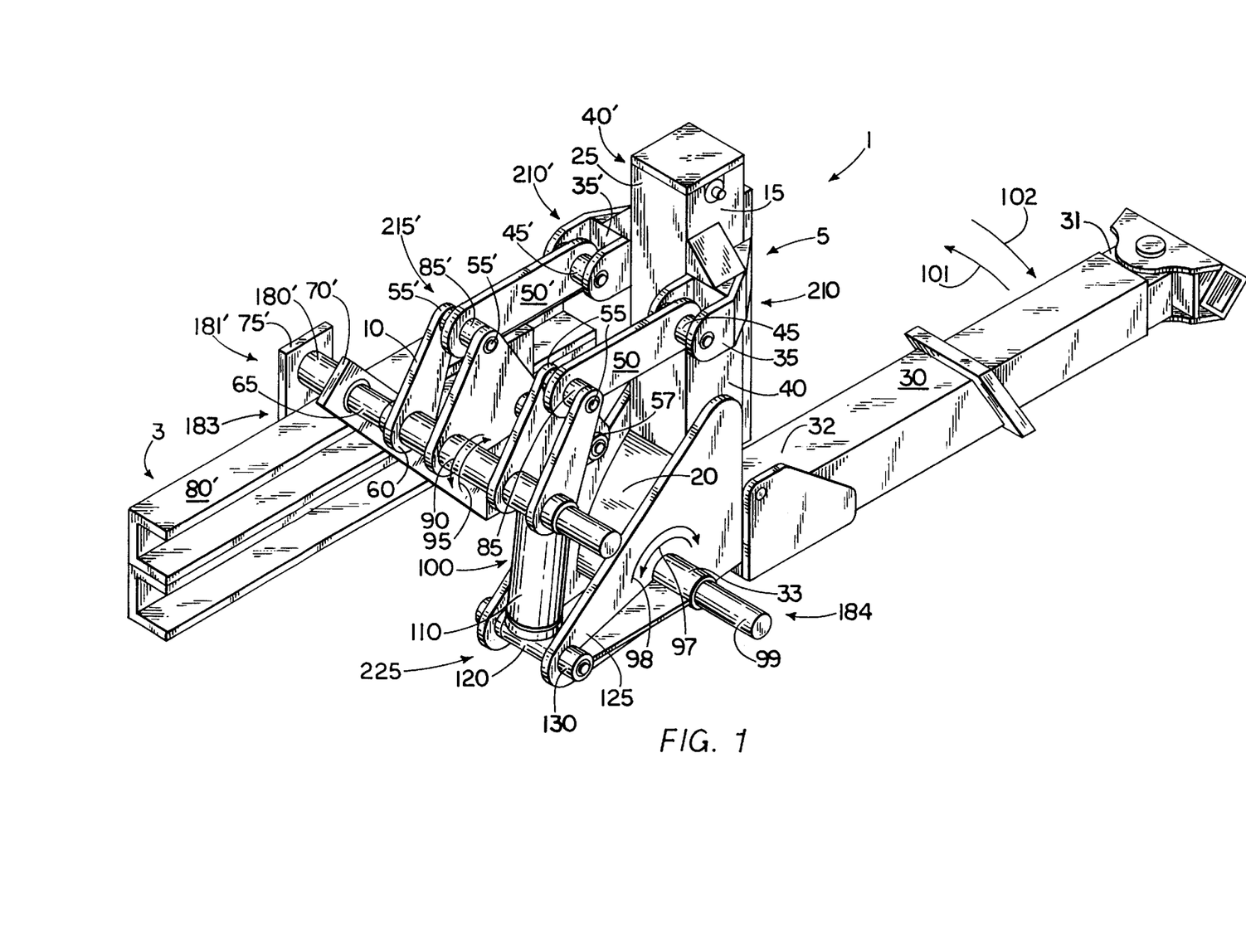
FIG. 1 is a perspective diagram of a portion of a lifting apparatus, according to an embodiment of this invention.

The invention provides a lifting apparatus 1 especially suited for a towing vehicle 2. FIG. 1 shows the lifting apparatus, according to an embodiment of this invention as mounted upon a frame 3. The lifting apparatus includes an L-shaped member 5 and a camming crank 10. The L-shaped member includes a riser leg 15, having a base end 20 and an upper end 25, connected to a boom leg 30 at the base end. The boom leg has a free end 31 and a front end 32. The front end of the boom leg is attached to the base of the riser leg. The base of the riser leg has a base frame pivot bearing 33. The riser leg also includes a riser pivot bracket 35 located at the upper end, which are preferably two riser pivot brackets 35 and 35', each mounted on an opposite side 40 and 40' of the upper end of the riser leg. Each riser pivot bracket hingeably connects to riser pivot bearings 45 and 45' of linkage arms 50 and 50'.

FIG. 1 also shows the camming crank 10, having crank pivot brackets 55 and 55', an actuator pivot bracket 57 and an upper frame pivot bearing 60. The upper frame pivot bearing receives a crank shaft 65. The crank shaft is mounted to the frame 3. An inside bracket plate 70 and an outside bracket plate 75 each attach to a frame member 80 of the frame. The inside bracket plate and the outside bracket plate each receive the crank shaft. Each of the crank pivot brackets of the camming crank hingeably connects to crank pivot bearings 85 and 85' of the linkage arms 50 and 50', respectively.

The camming crank 10 rotates on the crank shaft 65 in either a forward direction of rotation 90 or a rearward direction of rotation 95. An extensible and retractable force means connected to the actuator pivot bracket 57 selectably rotates the camming crank in either the forward direction of rotation or the rearward direction of rotation. Rotating the camming crank in the forward direction of rotation causes each of the linkage arms 50 and 50' to pull the riser leg 15 toward the upper frame pivot bearing 60, pivoting the riser leg upon the base frame pivot bearing 33 in a forward tilt direction 97. As the riser leg is pulled toward the upper frame pivot bearing in the forward tilt direction, the boom leg 30 is tilted upward 101, raising the free end 31 of the boom leg.

Conversely, rotating the camming crank 10 in the rearward direction of rotation 95 causes each of the linkage arms 50 and 50' to push the riser leg 15 away from the upper frame pivot bearing 60, pivoting the riser leg upon the base frame pivot bearing 33 in a rearward tilt direction 98. As the riser leg is pushed away from the upper frame pivot bearing in the rearward tilt direction, the boom leg 30 is tilted downward 102, lowering the free end 31 of the boom leg. Preferably, a base pivot shaft 99 is received within the base frame pivot bearing. The base pivot shaft mounts to the frame 3 of the tow vehicle 2.

Figure 2:
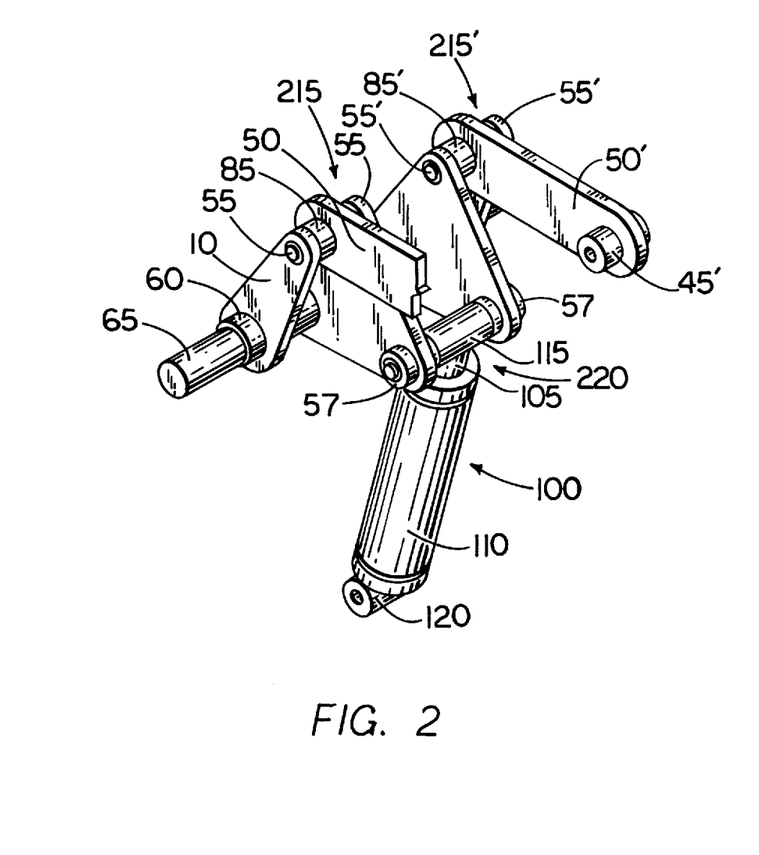
FIG. 2 is a perspective diagram of a portion of a lifting apparatus, according to an embodiment of this invention.

The extending and retracting actuator 100, is preferably a hydraulic actuator as shown in FIG. 2. FIG. 2 also shows the camming crank 10, the crank shaft 65 and each of the linkage arms 50 and 50'. FIG. 2 is a perspective from a view approximately opposed to the view of FIG. 1 and only partially illustrates one of the linkage arms 50. The hydraulic actuator is of a typical design and includes a piston 105 housed within a cylinder 110. The piston has an actuator pivot bearing 115 that hingeably attaches to actuator pivot bracket 57 of the camming crank. The cylinder of the hydraulic actuator has an anchor pivot bearing 120. As shown in FIG. 1, a lever arm 125 extends from the base end 20 of the riser leg 15. The lever arm is substantially parallel to the boom leg 30, and extends to the anchor pivot bearing. The lever arm has an anchor pivot bracket 130 that attaches to the anchor pivot bearing.

Figure 3:
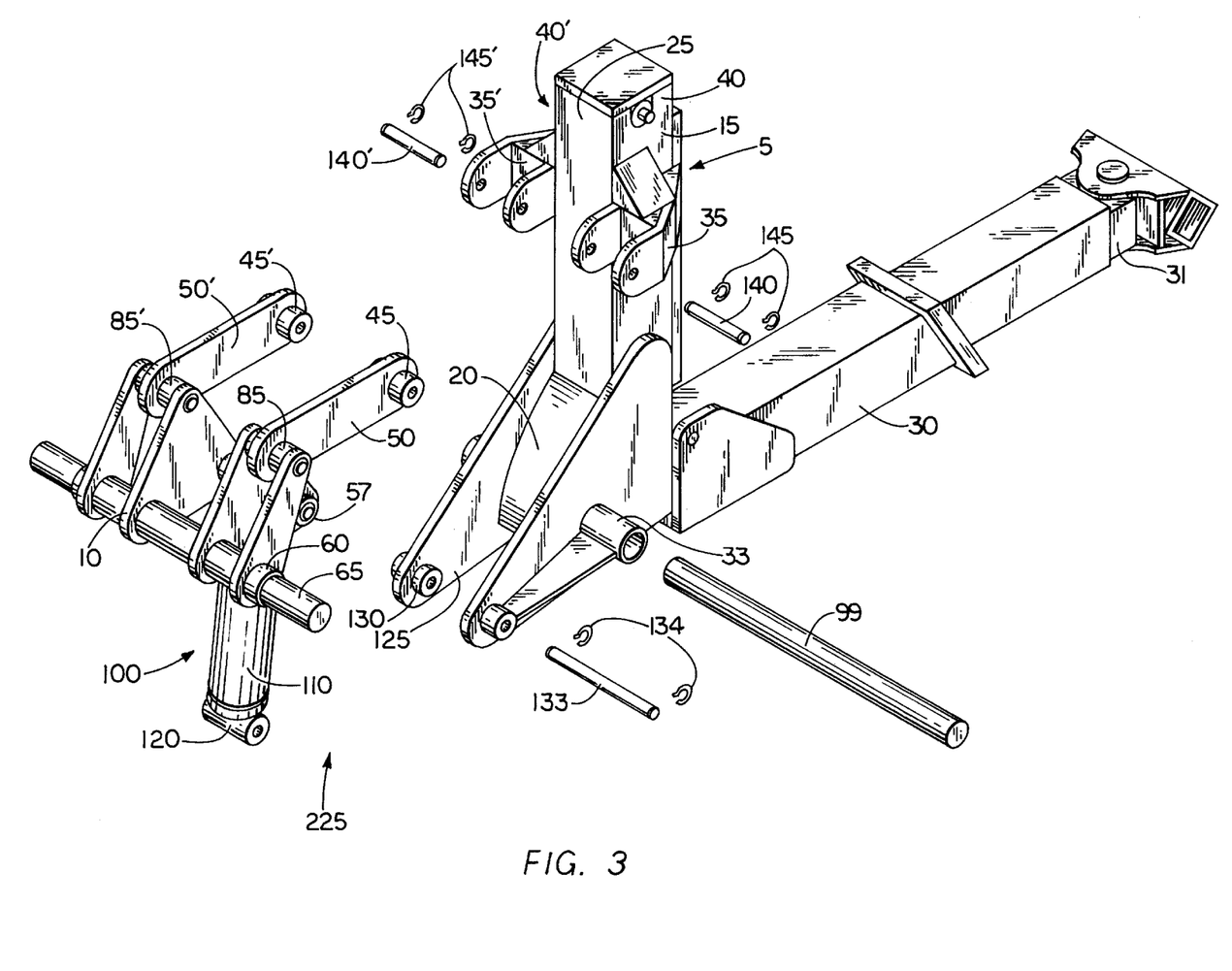
FIG. 3 is an exploded perspective diagram of a portion of a lifting apparatus, according to an embodiment of this invention.

Other mounting locations for the anchor pivot bracket 130 are contemplated within the scope of the invention. The anchor pivot bracket can be mounted to the frame 3 of the towing vehicle 2, or integral with the base frame pivot bearing 33, which receives the base pivot shaft 99. FIG. 3 shows an exploded perspective view from the same perspective angle as FIG. 1. FIG. 3 details the base pivot shaft as received into the base frame pivot bearing. The anchor pivot bracket 130 and the anchor pivot bearing 120 receive an anchor pin 133. A pair of anchor snap rings 134 retains the anchor pin in place.

The linkage arms' 50 and 50' connection of the riser leg 15 to the camming crank 10 is also detailed in FIG. 3. Preferably, each of the riser pivot brackets 35 and 35', on the upper end 25 of the riser leg, is mounted on opposite sides 40 and 40' of the riser leg. Riser linkage pins 140 and 140' are received into each riser pivot bracket and the riser pivot bearings 45 and 45' of the corresponding linkage arm. A pair of riser linkage snap rings 145 and 145' retain each of the riser linkage pins in place.

Figure 4:
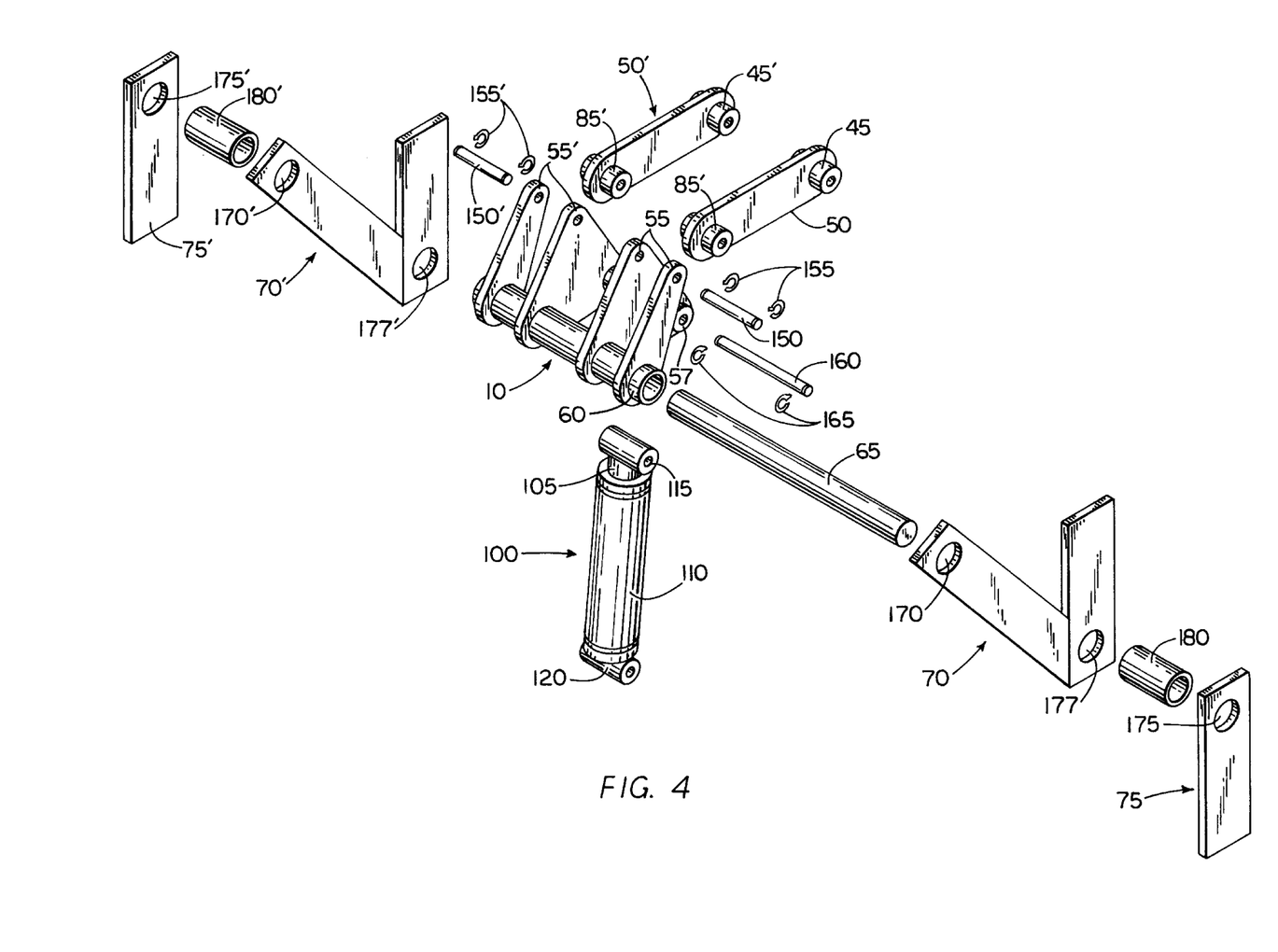
FIG. 4 is an exploded perspective diagram of a portion of a lifting apparatus, according to an embodiment of this invention.

FIG. 4 is a partial exploded perspective, again from the same angle of view as FIG. 1. FIG. 4 details crank linkage pins 150 and 150' received through each crank pivot bracket 55 and 55' of the camming crank 10 and the crank pivot bearing 85 and 85' of each corresponding linkage arm. Two pairs of crank linkage snap rings 155 and 155' retain each crank linkage pin in place.

FIG. 4 also details the attachment of the actuator pivot bearing 115, on the piston 105 of the hydraulic actuator 100, to the actuator pivot bracket 57 of the camming crank 10. A actuator pin 160 is received through the actuator pivot bracket and the actuator pivot bearing. Two pairs of actuator snap rings 165 and 165' retain the actuator pin in place.

Also, FIG. 4 shows how the crank shaft 65 is received into the upper frame pivot bearing 60 of the camming crank 10. Preferably, as shown, the crank shaft is received into inner crank shaft holes 170 and 170' in each of the inner bracket plates 70 and 70'. Outer crank shaft holes 175 and 175', in each of the outer bracket plates 75 and 75', also receive the crank shaft. Each of the inner bracket plates and the outer bracket plates sandwich frame members 80 and 80'. Additionally, the crank shaft is received by shaft sleeves 180 and 180', one located between each of the inner plate brackets and the outer plate brackets. The shaft sleeves act as spacers between the inner bracket plates and the outer bracket plates and further support the crank shaft upon the frame members. The inner bracket plates, inner crank shaft holes, shaft sleeves, outer bracket plates and outer crank shaft holes together form upper frame pivots brackets 181 and 181'. The upper frame pivot brackets, the crank shaft and the upper frame pivot bearing together form an upper frame pivot 183.

The upper frame pivot bearing 60 of the camming crank 10 is mounted to the crank shaft 65. The crank shaft rotates within each of the shaft sleeves 180 and 180', the inner crank shaft holes 170 and 170', and the outer crank shaft holes 175 and 175'.

FIG. 4 shows base pivot shaft holes 177 and 177' in the inner bracket plates 70 and 70', respectively. The base pivot shaft holes receive the base pivot shaft 99. The base pivot shaft holes, the inner bracket plates, and the base pivot shaft, together form a base pivot 184.

Figure 5:
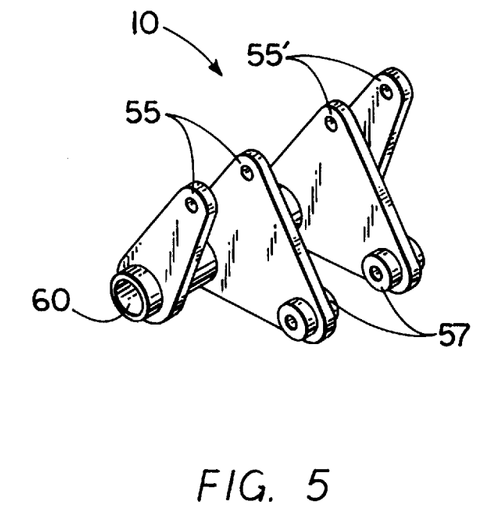
FIG. 5 is a perspective diagram of a camming crank of a lifting apparatus, according to an embodiment of this invention.

FIG. 5 details the camming crank alone, in the same perspective viewpoint as FIG. 2. Each of the crank pivot brackets 55 and 55', the actuator pivot bracket 57 and the upper frame pivot bearing 60, are shown.

Figure 6:
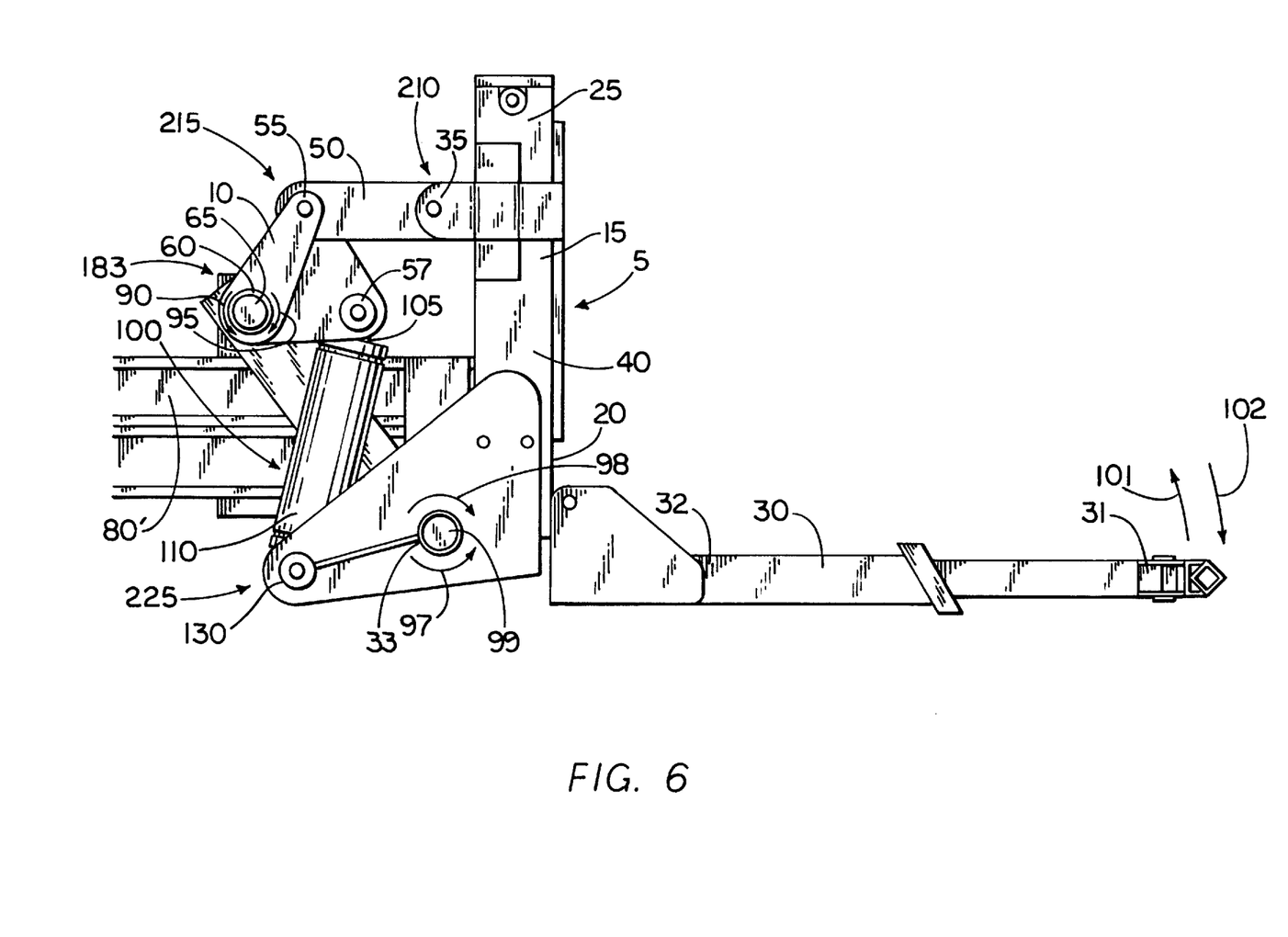
FIG. 6 is a side elevation diagram of a lifting apparatus, according to an embodiment of this invention.
Figure 7:
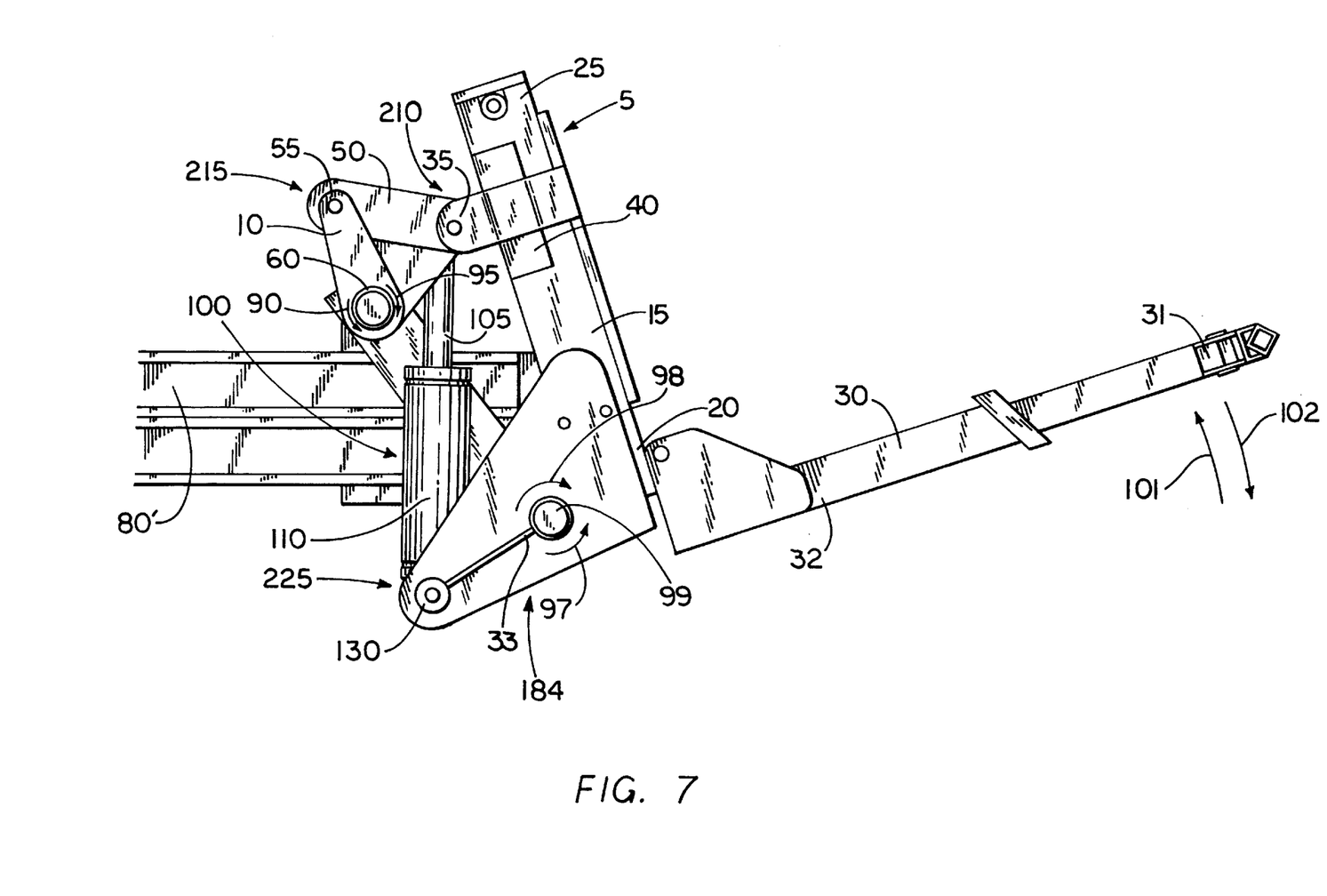
FIG. 7 is a side elevation diagram of a lifting apparatus, according to an embodiment of this invention.

FIG. 6 shows a side elevation of the lifting apparatus 1 with the piston 105 retracted. FIG. 7 shows a side elevation of the lift apparatus with the piston 105 extended. Hydraulic fluid (not shown) is forced into the hydraulic actuator 100 to extend or retract the piston, as directed by an operator of the lift apparatus. The piston extends, smoothly and incrementally, from the retracted position as shown in FIG. 6 to the extended position as shown in FIG. 7, or conversely retracts, smoothly and incrementally, from the extended position to the retracted position. The actuator pivot bearing 115 of the piston is attached to the actuator pivot bracket 57 of the camming crank 10. When extending, the piston forces the camming crank to turn in the forward direction of rotation 90. Conversely, as the piston retracts, it forces the camming crank to turn in the rearward direction of rotation 95. Alternatively, an equivalent force means such as a mechanical gear system or rack and pinion gear, or an equivalent extensible and retractable actuator, such as a pneumatic actuator or a screw drive, could all replace the hydraulic actuator.

As is also shown in FIG. 6 and FIG. 7, rotating the camming crank 10 in the forward direction of rotation 90 causes each of the linkage arms 50 and 50' to pull the riser leg 15 toward the upper frame pivot bearing 60, and thereby pivots the L-shaped member 5 upon the base frame pivot bearing 33 in a forward tilt direction 97, and tilts up 101 the boom leg 30, raising the free end 31 of the boom leg. Additional force is also applied by the hydraulic actuator 100, to help pivot the riser leg in the forward tilt direction. The anchor pivot bearing 120 of the hydraulic actuator pushes downward upon the lever arm 125 as the piston 105 extends from the cylinder 110.

Conversely, rotating the camming crank 10 in the rearward direction of rotation 95 causes each of the linkage arms 50 and 50' to push the riser leg 15 away from the upper frame pivot bearing 60, and thereby pivots the L-shaped member 5 upon the base frame pivot bearing 33 in a rearward tilt direction 98, and tilts down 102 the boom leg 30, lowering the free end 31 of the boom leg. Additional force is also applied by the hydraulic actuator 100, to help pivot the riser leg in the rearward tilt direction. The anchor pivot bearing 120 of the hydraulic actuator pulls upward upon the lever arm 125 as the piston 105 retracts into the cylinder 110.

The extending force of the hydraulic actuator 100, translates to an upward force of the boom leg 30, with a high degree of efficiency. A mechanical advantage is gained by levering the riser leg 15, resulting in a more effective mechanism for mechanical lift as compared to directly actuating the boom leg. Additionally, the hydraulic actuator forces the lever arm 125 down, providing an additional mechanical levering advantage, translated across the base frame pivot bearing 33, to force the boom leg upward. The size and weight of the hydraulic actuator is thereby minimized, and the structural strength and weight capacity of the lifting apparatus 1 is maximized.

The lifting apparatus 1 easily adapts to a variety of applications. The free end 31 of the boom leg 30 can be fitted with a tire engaging wheel carriage assembly (not shown) for wheel-lifts, but other applications are also contemplated. The lifting apparatus could be mounted on a fork lift type vehicle. Additionally, the lifting apparatus could be adapted to lift or partially lift boats, airplanes, tracked vehicles, and tractors. Stationary or non-mobile installations for the lifting apparatus are also contemplated. Gangways serving watercraft or aircraft, loading dock ramps, security gates and draw bridges could all use this lifting apparatus.

Figure 8:
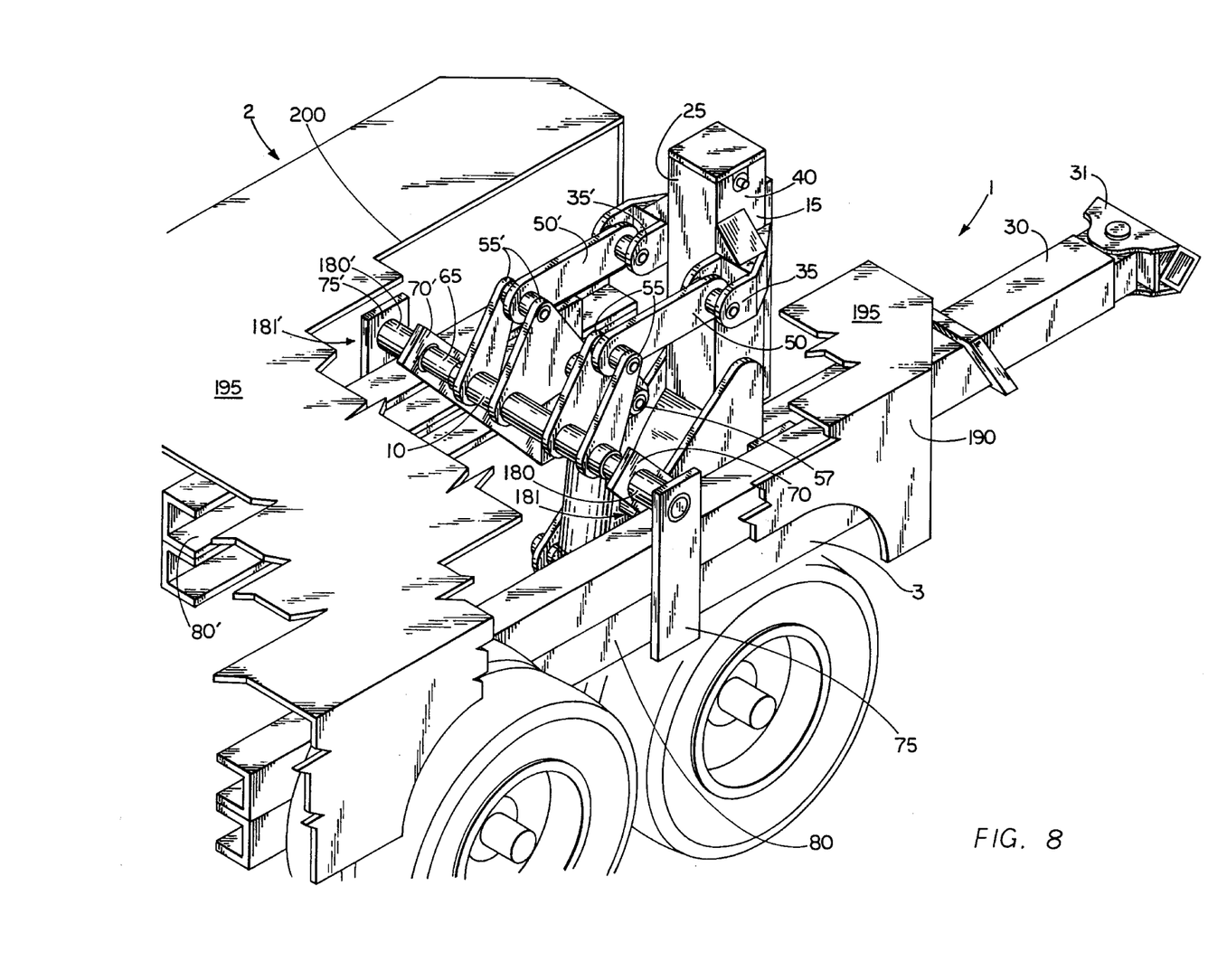
FIG. 8 is a cut away perspective diagram of a lifting apparatus, according to an embodiment of this invention.

FIG. 8 shows a cut away perspective of the lifting apparatus 1 mounted upon a tow vehicle 2. The tow vehicle shown is a truck and the lifting apparatus is mounted to the rear 190 of the truck on the frame members 3 of the truck. Most of the lift apparatus is contained below a rear deck 195 of the truck. A deck cutout 200, in the rear deck, allows the upper end 25 of the riser 15, each of the linkage arms 50 and 50', and the camming crank 10 to extend above the deck. The boom leg 30 extends from the rear of the truck. Mounting the lifting apparatus to the sides or the front of a tow vehicle is also possible, and would be achieved by mounting the lifting apparatus to an appropriate frame member.

Tow vehicles 2 such as trucks are typically retrofitted with the lift apparatus 1. The lift apparatus' manufacturer receives the truck at its factory, where the lift apparatus is installed. The lift apparatus is compact by virtue of the L-shaped bar 5 closely integrating with the camming crank 10 and additionally the hydraulic actuator 100, located between the riser leg 15 and the crank shaft 65. The lift apparatus also accommodates the frame 3 of the truck with the inside bracket plates 70 and 70', and outside bracket plates 75 and 75', effectively sandwiching existing frame members 80 and 80' of the frame, for structural support.

Preferably, the lifting apparatus 1 primarily relies upon pivots to form the hingeable connections. Typically, these pivots each consist of a pivot bearing hingeably received into a pivot bracket. Alternatively, many of the pivots herein described could be replaced with other known hingeable type connections to serve the same function as the pivot bearings and the pivot brackets as described.

The pivot brackets and pivot bearings when connected by pins and snap rings, form pivot that are hingeable. For example, riser pivot brackets 35 and 35' connect with riser pivot bearings 45 and 45' with riser linkage pins 140 and 140' and pairs of riser linkage snap rings 145 and 145' respectively, to form a riser pivot 210 and a riser pivot 210', as shown in FIG. 3. Also, crank pivot brackets 55 and 55' in their connection with crank pivot bearings 85 and 85' with crank linkage pins 150 and 150', and pairs of crank linkage snap rings 155 and 155', form a crank pivot 215 and a crank pivot 215' respectively, as shown in FIG. 4. Likewise, the actuator pivot bracket 57 connects to the actuator pivot bearing 115 with actuator pin 160 and actuator snap rings 165, forming an actuator pivot 220, as shown in FIG. 4. Also, the anchor pivot bracket 130 connects to the anchor pivot bearing 120 with anchor pin 133 and anchor snap rings 134, forming an anchor pivot 225, as shown in FIG. 3. Also importantly, it is contemplated that single riser pivots could be employed instead of the pairs of riser pivots as described herein. Likewise, the pair of crank pivots and the pair of riser pivots could be replaced by a single crank pivot and a single riser pivot. Additionally noteworthy is that any one or combination of the pivots could be replaced with a plurality of pivots, if desired.

Additionally, the relative positions of the pivot brackets and pivot bearings could easily be interchanged, the bracket becoming the bearing and visa-versa. For example, riser pivot brackets 35 and 35' that connect with riser pivot bearings 45 and 45' respectively, could be interchanged. Also interchangeable are crank pivot brackets 55 and 55' in their connection with crank pivot bearings 85 and 85' respectively. Likewise interchangeable is the actuator pivot bracket 57 that connects with the actuator pivot bearing 115. Also interchangeable is the anchor pivot bracket 130 that connects with the anchor pivot bearing 120.

In a preferred method, an L-shaped member 5 having a riser leg 15 and a boom leg 30 is mechanically tilted. The riser leg includes a base end 20 and an upper end 25, and the boom leg includes a front end 32 and a free end 31. The front end of the boom leg is attached to the base end of the riser leg. A base pivot 184 is provided at the base end of the riser leg. A riser pivot 210 is provided at the upper end of the riser leg. A linkage arm 50 is provided, hingeably connecting the linkage arm to the riser pivot. A camming crank 10 is provided, having a forward direction of rotation 90, a rearward direction of rotation 95, a crank pivot 215 and an upper frame pivot 183. The camming crank selectably rotates in the forward direction of rotation or the rearward direction of rotation. The crank pivot of the camming crank hingeably connects the linkage arm. The upper frame pivot hingeably mounts to a frame 3. The base frame pivot also mounts to the frame. The camming crank rotates in the forward direction of rotation, about the upper frame pivot, pulling the linkage arm. The linkage arm then pulls the riser leg, tilting the L-shaped member about the base pivot, and raising the free end of the boom leg upward 101. Conversely, the camming crank also rotates the rearward direction of rotation, about the upper frame pivot, pushing the linkage arm. The linkage arm then pushes the riser leg, tilting the L-shaped member about the base pivot in the rearward tilt direction, and lowering the free end of the boom leg downward 102.

In use, the lifting apparatus 1 attached to the frame 3 of the towing vehicle 2 or tow truck, and further equipped with a wheel carriage assembly (not shown), is positioned by an operator to a vehicle (not shown). The free end 31 of the boom leg 30 is moved downward 102. The operator can then affix the front or rear wheels of the vehicle to the wheel carriage assembly, raise the free end of the boom leg upward 101 and drive the tow truck away, with the vehicle trailing behind, supported by the tow truck and additionally by the remaining two tires of the vehicle. If the vehicle's brakes are engaged or the vehicle is in gear and thus prevented from rolling freely, a wheeled dolly can be placed beneath the wheels of the towed vehicle.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible which employ the same inventive concepts as described above. Therefore, the invention is not to be limited except by the claims that follow.

What is claimed is:

1. A lifting apparatus comprising:
   an L-shaped member having a riser leg and a boom leg, the riser leg including a base end and an upper end, the boom leg including a front end and a free end, and the front end of the boom leg attached to the base end of the riser leg;
   a base pivot at the base end of the riser leg, the base pivot tiltably mounted to a support frame;
   an anchor pivot located on the L-shaped member proximate the base pivot,
   a riser pivot at the upper end of the riser leg;
   a linkage arm hingeably connected to the riser pivot;
   a camming crank having
      a forward direction of rotation and a rearward direction of rotation,
      a crank pivot hingeably connected to the linkage arm,
      an upper frame pivot, hingeably mounted to the support frame, and
      an actuator pivot; and
   an actuator for rotating the camming crank in the forward direction of rotation, about the upper frame pivot, to pull the linkage arm, so that the linkage arm pulls the riser leg and tilts the L-shaped member about the base pivot to raise the free end of the boom leg,
   the actuator including an actuator pivot bearing and an anchor pivot bearing, the actuator pivot bearing connected to the actuator pivot of the camming crank and the anchor pivot bearing connected to the anchor pivot of the L-shaped member.

2. The lifting apparatus of claim 1, wherein the frame is a frame of a towing vehicle.

3. The lifting apparatus of claim 1, wherein the frame is a frame of a towing vehicle for the purpose of lifting a vehicle.

4. A lifting apparatus comprising:
   an L-shaped member having a riser leg and a boom leg, the riser leg including a base end and an upper end, the boom leg including a front end and a free end, and the front end of the boom leg attached to the base end of the riser leg;
   a base pivot bearing at the base end of the riser leg, the base pivot tiltably mounted to a support frame;
   a riser pivot bracket at the upper end of the riser leg;
   a linkage arm having
      a riser pivot bearing, hingeably connected to the riser pivot bracket, and
      a crank pivot bearing;
   a camming crank having,
      a forward direction of rotation and a rearward direction of rotation,
      a crank pivot bracket, hingeably connected to the crank pivot bearing of the linkage arm,
   an upper frame pivot bearing, hingeably mounted to the support frame, and
   an actuator pivot bracket; and
   a force means for rotating the camming crank in the forward direction of rotation, about the upper frame pivot bearing, to pull the linkage arm, so that the linkage arm pulls the riser leg and tilts the L-shaped member about the base pivot to raise the free end of the boom leg.

5. The lifting apparatus of claim 4, wherein the force means for rotating the camming crank rotates the camming crank in the rearward direction of rotation, about the upper frame pivot bearing, to push the linkage arm, the linkage arm pushes the riser leg and tilts the L-shaped member to lower the free end of the boom leg.

6. The lifting apparatus of claim 5, wherein the force means for rotating the camming crank selectably rotates the camming crank in the forward direction of rotation or the rearward direction of rotation, about the upper frame pivot bearing.

7. The lifting apparatus of claim 4, wherein the force means is an extending and retracting actuator, the extending and retracting actuator having an actuator pivot bearing and an anchor bearing, the actuator pivot bearing connected to the actuator pivot bracket of the camming crank, and the anchor pivot bearing connected to an anchor pivot bracket.

8. The lifting apparatus of claim 7, wherein the anchor pivot bracket is directly attached to the frame.

9. The lifting apparatus of claim 7, wherein the anchor pivot bracket is proximate to the base end of the riser leg.

10. The lifting apparatus of claim 7, wherein the anchor pivot bracket is attached to a lever arm, and the lever arm extends from the base end of the riser leg, substantially parallel to the boom leg.

11. The lifting apparatus of claim 7, wherein the extending and retracting actuator is a hydraulic cylinder and piston.

12. The lifting apparatus of claim 4, wherein:

the riser pivot bracket is a plurality of riser pivot brackets, the linkage arm is a plurality of linkage arms, the crank pivot bracket is a plurality of crank pivot brackets, the riser pivot bearing is a plurality of riser pivot bearings, and the crank pivot bearing is a plurality of crank pivots bearings.

13. A lifting apparatus comprising:

an L-shaped member having a riser leg and a boom leg, the riser leg including a base end and an upper end, the boom leg including a front end and a free end, and the front end of the boom leg attached to the base end of the riser leg;

a base pivot bearing at the base end of the riser leg, the base pivot tiltably mounted to a frame member of a towing vehicle;

a riser pivot bracket at the upper end of the riser leg;

a lever arm extended from the base end of the riser leg, substantially parallel to the boom leg;

an anchor pivot bracket attached to the lever arm;

a linkage arm having a riser pivot bearing and a crank pivot bearing, the linkage arm hingeably connected at the riser pivot bearing to the riser pivot bracket;

a camming crank hingeably mounted to the frame of a towing vehicle, the camming crank having a forward direction of rotation, a rearward direction of rotation, a crank pivot bracket, an actuator pivot bracket, an upper frame pivot bearing, the upper frame pivot bearing hingeably mounted to the frame member of a towing vehicle, the crank pivot bracket hingeably connected to the crank pivot bearing of the linkage arm; and an extending and retracting actuator, for rotating the camming crank to selectably rotate the camming crank, in the forward direction of rotation, about the upper frame pivot bearing, to pull the linkage arm, so that the linkage arm pulls the riser leg, and tilts the L-shaped member, to raise the free end of the boom leg, or in a rearward direction of rotation, about the upper frame pivot bearing, to push the linkage arm, the linkage arm to push the riser leg and tilt the L-shaped member, to lower the free end of the boom leg, the extending and retracting actuator having an actuator pivot bearing and an anchor pivot bearing, the actuator pivot bearing connected to the actuator pivot bracket of the camming crank and the anchor pivot bearing connected to the anchor pivot bracket.

14. A method for raising a boom leg which comprises:

a) providing an L-shaped member having a riser leg and a boom leg, the riser leg including a base end and an upper end, and the boom leg including a front end and a free end;

b) providing a base frame pivot at the base end of the riser leg;

c) mounting the base frame pivot to a support frame;

d) providing a riser pivot at the upper end of the riser leg;

e) providing a linkage arm, f) hingeably connecting the linkage arm to the riser pivot;

g) providing a camming crank having a forward direction of rotation and a rearward direction of rotation, a crank pivot and an upper frame pivot;

h) hingeably connecting the crank pivot of the camming crank to the linkage arm;

i) mounting the upper frame pivot to the support frame;

j) mounting the base frame pivot to the support frame;

k) rotating the camming crank in the forward direction of rotation, about the upper frame pivot;

l) pulling the linkage arm, the linkage arm to pull the riser leg;

m) tilting the L-shaped member about the base frame pivot; and o) raising the free end of the boom leg.

15. A method for raising a boom leg which comprises:

a) providing an L-shaped member having a riser leg and a boom leg, the riser leg including a base end and an upper end, and the boom leg including a front end and a free end;

b) providing a base frame pivot bearing at the base end of the riser leg;

c) mounting the base frame pivot to a support frame of a towing vehicle;

d) providing a riser pivot bracket at the upper end of the riser leg;

e) providing a linkage arm, the linkage arm including a riser pivot bearing, and a crank pivot bearing;

f) hingeably connecting a riser pivot bearing to the riser pivot bracket;

g) providing a camming crank having a forward direction of rotation and a rearward direction of rotation, a crank pivot bracket, and an upper frame pivot bearing;

h) hingeably connecting the crank pivot bracket of the camming crank, to the crank pivot bearing of the linkage arm;

i) mounting an upper frame pivot bracket to the support frame;

j) hingeably connecting the upper frame pivot bearing to the upper frame pivot bracket;

k) mounting a base frame pivot bracket to the support frame;

l) hingeably connecting the base frame pivot bearing to the base frame pivot bracket;

m) rotating the camming crank in the forward direction of rotation, about the upper frame pivot bearing;

n) pulling the linkage arm with the camming crank;

o) pulling the riser leg with the linkage arm, p) tilting the L-shaped member by pulling on the riser leg to raise the free end of the boom leg.

16. The method of claim 15, with the additional step of:

n) lifting a vehicle with the raising of the free end of the boom leg.

17. The method of claim 15, with the additional step of:

n) rotating the camming crank in the rearward direction of rotation, about the upper frame pivot bearing, pushing the linkage arm, the linkage arm pushing the riser leg tilting the L-shaped member, lowering the free end of the boom leg.

18. The method claim 17, wherein the camming crank selectably rotates the camming crank in the forward direction of rotation or the rearward direction of rotation, about the upper frame pivot bearing.

19. The method of claim 18, with the additional step of:

o) selectively lifting or lowering lifting a vehicle with the respective raising or lowering of the free end of the boom leg.

20. A lifting apparatus comprising:

an L-shaped member having a riser leg and a boom leg, the riser leg including a base end and an upper end, the boom leg including a front end and a free end, and the front end of the boom leg attached to the base end of the riser leg;

a base pivot bearing at the base end of the riser leg, the base pivot tiltably mounted to a support frame;

a riser pivot bracket at the upper end of the riser leg;

a linkage arm having
   a riser pivot bearing, hingeably connected to the riser pivot bracket, and
   a crank pivot bearing;

a camming crank having,
   a forward direction of rotation and a rearward direction of rotation,
   a crank pivot bracket, hingeably connected to the crank pivot bearing of the linkage arm,
   an upper frame pivot bearing, hingeably mounted to the support frame, and
   an actuator pivot bracket; and a force means for rotating the camming crank in the forward direction of rotation, about the upper frame pivot bearing, to pull the linkage so that the linkage arm pulls the riser leg and tilts the L-shaped member about the base pivot to raise the free end of the boom leg, and the force means is an extending and retracting actuator,
   the extending and retracting actuator having an actuator pivot bearing and an anchor bearing,
   the actuator pivot bearing is connected to the actuator pivot bracket of the camming crank, and
   the anchor pivot bearing is connected to an anchor pivot bracket,
   the anchor pivot bracketing is attached to a lever arm, and
   the lever arm extends from the base end of the riser leg, substantially parallel to the boom leg.

* * * * *